Sept. 6, 1932.         A. E. LEE                    1,875,617
                 MEASURING INSTRUMENT
              Filed May 31, 1929        2 Sheets-Sheet 1

Inventor
Adelbert E. Lee.
By
Attorney

Inventor
Adelbert E. Lee.

Patented Sept. 6, 1932

1,875,617

UNITED STATES PATENT OFFICE

ADELBERT E. LEE, OF AKRON, OHIO, ASSIGNOR TO THE GOODYEAR TIRE & RUBBER COMPANY, OF AKRON, OHIO, A CORPORATION OF OHIO

MEASURING INSTRUMENT

Application filed May 31, 1929. Serial No. 367,192.

This invention relates to a measuring instrument and it has particular relation to gauges for measuring the thickness of sheet rubber.

The object of the invention is to provide means for indicating the gauge of sheet material before it passes between calender rolls so that if any inequalities exist in the material, they will be at once apparent and the rolls may be adjusted to obviate them.

In the production of sheet rubber, it is very desirable to have the sheets of uniform thickness and this is particularly true when thin rubber sheets are to be applied to fabric. A small discrepancy in the thickness of the rubber not only causes a waste of material but a defective product.

Since the invention described herein is used principally in conjunction with calender rolls adapted for treatment of rubber, it will be helpful in understanding the characteristics of the invention, to explain briefly the operation of calender rolls. Ordinarily, there are three rolls used in a calender unit which are disposed in superposed parallel relationship. The stock in conglomerate form is fed between the upper and intermediate rolls and as it emerges therefrom, it assumes the form of sheet material. This sheet material is then passed between the lower and intermediate rolls and emerges therefrom a sheet material of the desired thickness. In my invention, a measuring instrument is disposed adjacent the upper calender roll and engages the material after it has passed between the upper and intermediate calender rolls. The measuring instrument is provided with a vernier attachment secured to an eccentric shaft rotatably mounted in the lower end of a stationary frame, the position of the latter being adjustable by means of a micrometer screw. A roller, mounted upon the eccentric shaft, is adapted to engage the sheet material. It will be apparent that means is provided for constantly giving visible evidence of the condition of the sheet material whereby any variations in the material may be immediately noted and proper adjustments made to secure a uniform product.

For a better understanding of the invention, reference may now be had to the accompanying drawings, in which.

Figure 1:
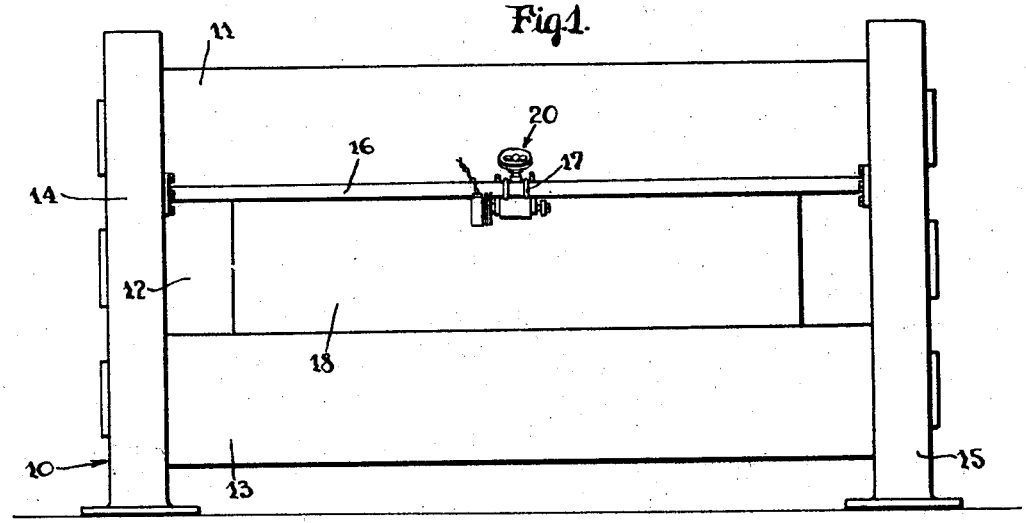
Fig. 1 is an elevational view showing a calender with a measuring device attached, which is constructed in accordance with the invention.

The invention is utilized in conjunction with a calender 10 having rollers 11, 12 and 13 mounted in standards 14 and 15, which are connected by a bar 16. Rubber stock is passed between the rollers 11 and 12 to form strip material 18. A measuring device 20 is mounted adjacent the roll 12 by means of clamps 17 secured to the bar 16. The measuring device is provided with a shaft 22 having eccentric portions 23 and 24 upon which a roller 25 is rotatably mounted by means of bearings 26 and 27. The shaft 22 is mounted in bearings 29 and 30 secured to a frame 32 having bearing surfaces 33 and 34.

A sleeve 35, having threads 36 on its outer periphery, is rotatably mounted on the frame 32 in engagement with the bearing surfaces 33 and 34. A flanged sleeve 37, having threads on its inner periphery, is disposed about the sleeve 35 and is slidably secured to the frame by bolts 39, springs 40 and nuts 41. A dial 43 is mounted on the end of one of the bolts 39 to form a micrometer screw in combination with a graduated hand wheel 44 which is rigidly secured to the sleeve 35 by means of a wedging ring 45, washer 46 and thumb screw 47. The position of the frame 32 can be regulated whereby the roller 25 will engage the surface of sheet material of any required thickness. This adjustment is effected by turning the hand wheel 44 to rotate the sleeve 35 thereby slidably actuating the frame 32 carried by the guide bolts 39 and compressing the springs 40. The springs, of course, function to aid a reverse adjustment and obviate the necessity of a very close engagement between the bearing surfaces 33, 34 and the sleeve 35.

An elongate plate 49, having equally spaced transverse slots 50, is secured to an arm 51 by bolts 52 and rigidly mounted upon the frame 32 by screws 53. A vernier 54, having a number of equally spaced transverse slots 55, preferably equal to the number of slots 50, but with the distance between the slots 55 less than the distance between the slots 50, is secured, by means of screws 56, to a bifurcated arm 57 which is adjustably mounted upon the shaft 22 by means of a bolt 58. An illuminating device 59 is secured to the plate 49 adjacent the vernier.

Figure 2:
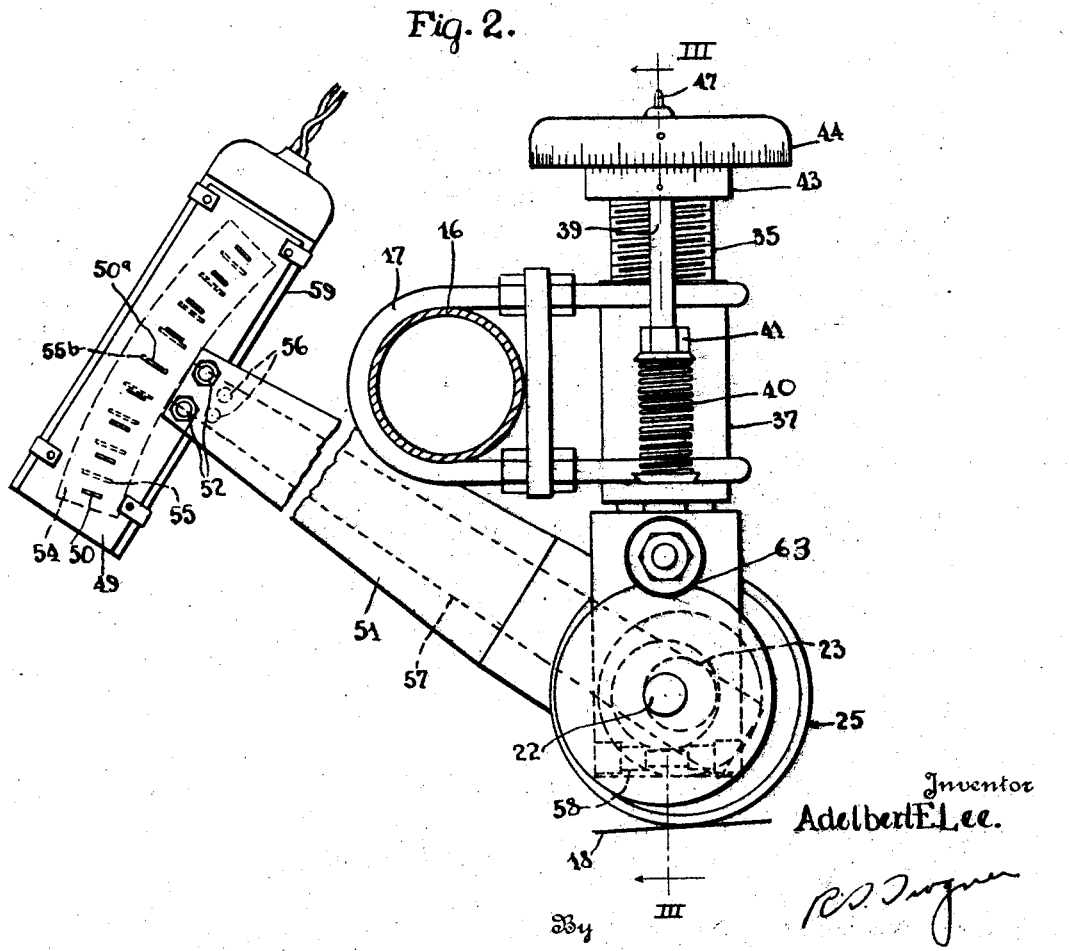
Fig. 2 is a side elevational view of the measuring instrument.
Figure 3:
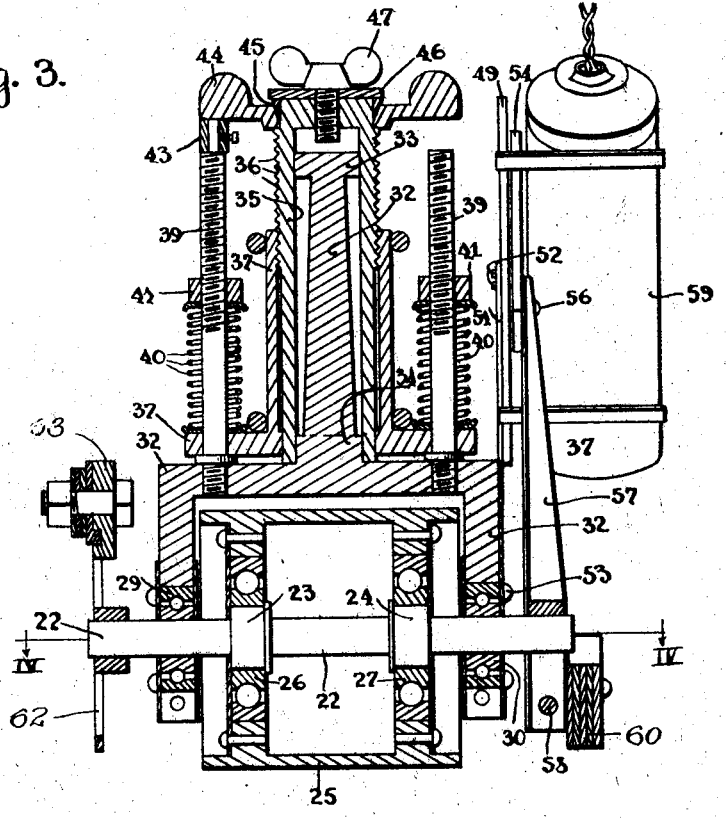
Fig. 3 is a cross-sectional view of the measuring instrument taken substantially along a line III—III of Fig. 2.
Figure 4:
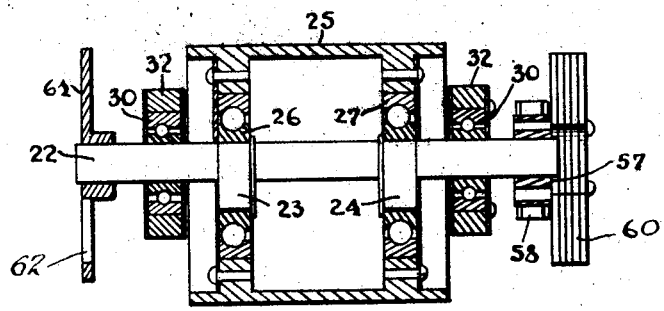
Fig. 4 is a cross-sectional view taken substantially along a line IV—IV of Fig. 3.

As best shown in Fig. 2, the axes of the roller 25 and the shaft 22 are parallel and in the same horizontal plane when the medial slot 50a of the plate 49 and the medial slot 55b of the vernier 54 are in alignment. As long as the sheet material is of uniform thickness the axis of the shaft 22 and the axis of the roller 25 remain in the same relative positions, but when the thickness of the sheet material 18 varies, the axis of the roller 25 moves either downwardly by the force of gravity if the material is too thin, or upwardly by reason of the force exerted by the sheet material 18 against the roller 25, if the sheet material is too thick. Any deviation in the sheet material will, therefore, cause the shaft 22 to be turned and the vernier 54 to be actuated. The plate 49 and vernier 54 are so mounted that regardless of the movement of the roller 25 caused by the variation of the sheet material 18 only one of the slots 55 of the vernier 54 and one of the slots 50 of the plate 49 can be in alignment at any one position. With this construction, the rays from the illuminating device 59 will flash through the slots 55 and 50 of the vernier 54 and plate 49 that are in alignment disclosing to the operator any variation in the thickness of the sheet material.

A counterweight 60 is secured to the arm 57 adjacent the shaft 22 and is of sufficient weight to balance the shaft 22 and the rollers 23 in any position they may assume. A disc 61 mounted on the opposite end of the shaft 22 is provided with a circumferentially extending slot 62, and a weight 63 is adjustably secured to the outer portion of the disc, commensurate in length to the slot. The position of the weight 63 on the disc 61 is such that the roller 25 is always maintained in contacting relation with the sheet material 18.

From the foregoing description, it is apparent that a measuring instrument is provided with a novel and simple means for indicating the slightest variation in the sheet material. Although I have illustrated only the preferred form of the invention and have described that form in detail, it will be apparent to those skilled in the art that the invention is not so limited but that various modifications may be made therein without departing from the spirit of the invention or from the scope of the appended claims.

What I claim is:

1. A device for gauging the thickness of sheet material during its movement over a support, comprising a frame, a rotatable shaft mounted in the frame and having a pair of eccentric portions, a roller mounted on the eccentric portions of the shaft, an elongate plate secured to the frame, having substantially equally spaced slots therein, an arm mounted on one end of the shaft, an arcuate plate secured to the arm, having slots therein coacting with the slots in the first mentioned plate for indicating variations in the thickness of the material, illuminating means at one side of the plates, and means for adjusting the position of the frame with respect to the support.

2. A device for gauging the thickness of sheet material comprising a frame, a rotatable shaft mounted in the frame and having an eccentric portion, a roller mounted on the eccentric portion, an elongate plate secured to the frame and having spaced slots therein, and an arcuate plate secured to the shaft and having slots therein coacting with the slots in the first named plate to indicate rotative movement of the shaft.

In witness whereof, I have hereunto signed my name.

Signed at Akron, in the county of Summit and State of Ohio, U. S. A., this 29th day of May, 1929.

ADELBERT E. LEE.